(12) United States Patent
Bonanno

(10) Patent No.: US 10,125,891 B2
(45) Date of Patent: Nov. 13, 2018

(54) VALVE

(71) Applicant: CONTINENTAL AUTOMOTIVE GMBH, Hannover (DE)

(72) Inventor: Rasario Bonanno, Bad Soden (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/907,177

(22) PCT Filed: Jul. 8, 2014

(86) PCT No.: PCT/EP2014/064578
§ 371 (c)(1),
(2) Date: Jan. 22, 2016

(87) PCT Pub. No.: WO2015/010890
PCT Pub. Date: Jan. 29, 2015

(65) Prior Publication Data
US 2016/0178082 A1 Jun. 23, 2016

(30) Foreign Application Priority Data
Jul. 25, 2013 (DE) .......... 10 2013 214 594

(51) Int. Cl.
*F16K 31/06* (2006.01)
*F02B 37/16* (2006.01)
*F16K 1/48* (2006.01)

(52) U.S. Cl.
CPC .......... *F16K 31/0693* (2013.01); *F02B 37/16* (2013.01); *F16K 1/482* (2013.01); *Y02T 10/144* (2013.01)

(58) Field of Classification Search
CPC .. F16K 31/0693; F16K 1/482; F16K 31/0686; F16K 39/022; F02B 37/16; Y02T 10/144
USPC ........................................ 251/129.07, 129.15
See application file for complete search history.

(56) References Cited

U.S. PATENT DOCUMENTS

| 4,858,886 A | * | 8/1989 | Tatara | .................... F02M 23/04 251/129.07 |
| 4,988,967 A | * | 1/1991 | Miller | ....................... F16F 9/46 251/129.05 |
| 5,497,975 A | * | 3/1996 | Achmad | ............... F16K 39/022 251/129.07 |
| 6,000,677 A | * | 12/1999 | Cook | .................. F16K 31/0696 251/129.07 |
| 6,505,812 B1 | * | 1/2003 | Anastas | ............. F16K 31/0693 251/129.07 |

(Continued)

FOREIGN PATENT DOCUMENTS

CN 101 354 092 A 1/2009
CN 202 469 033 U 10/2012
(Continued)

*Primary Examiner* — Mary McManmon
*Assistant Examiner* — Patrick Williams
(74) *Attorney, Agent, or Firm* — Cozen O'Connor

(57) ABSTRACT

A valve includes a housing, a solenoid, a pin movable by the solenoid, and a piston connected to the pin. The piston includes an annular base body having a sealing edge. The annular base body has a base embodied as a membrane. The membrane has a bushing in the center thereof and the bushing is connected to the pin.

7 Claims, 3 Drawing Sheets

(56) References Cited

U.S. PATENT DOCUMENTS

| | | | |
|---|---|---|---|
| 6,871,802 B2* | 3/2005 | Stilwell | F16K 1/305 169/19 |
| 8,387,383 B2 | 3/2013 | Thiery et al. | |
| 2011/0186760 A1* | 8/2011 | Michl | B60T 8/363 251/129.15 |

FOREIGN PATENT DOCUMENTS

| | | |
|---|---|---|
| DE | 30 23 515 | 1/1983 |
| DE | 10 2011 087 553 | 6/2013 |
| DE | 10 2011 056096 A1 | 6/2013 |
| WO | WO 2007/048828 A1 | 5/2007 |
| WO | WO 2014/095396 A1 | 6/2014 |
| WO | WO 2014/095402 A1 | 6/2014 |
| WO | WO 2014/095403 A1 | 6/2014 |

* cited by examiner

VALVE

CROSS-REFERENCE TO RELATED APPLICATIONS

This is a U.S. national stage of application No. PCT/EP2014/064578, filed on 8 Jul. 2014, which claims priority to the German Application No. DE 10 2013 214 594.2 filed 25 Jul. 2013, the content of each of which incorporated herein by reference.

BACKGROUND OF THE INVENTION

1. Field of the Invention

The invention relates to a valve having a housing, a solenoid arranged in the housing, a pin movable by the solenoid and a piston connected to the pin.

2. Related Art

Such valves are used, among other things, as recirculation air valves in turbochargers in motor vehicles in order during thrust operation to release a bypass to the suction side and are consequently known. In order to prevent excessive braking of the turbocharger but also to ensure rapid start up, a rapid opening and closing of the valve is a significant requirement. In particular during closing, the immediate closure by the placement of the piston on a valve seat is a significant aspect. The valve seat is formed by the housing of the turbocharger to which the valve is flanged. This results in the valve seat not being completely parallel with the piston, which would be required for a rapid and above all sealed closure action. In order nonetheless to ensure reliable closure, the piston has to adapt to the valve seat. To this end, it is known to construct the piston as an annular base member having fingers that protrude radially inwards in an oblique manner and engage in a radially peripheral groove of the pin. As a result of their resilience, the fingers enable a movement of the piston relative to the pin. It has been found that, as a result of production and assembly tolerances, the piston and pin are not connected to each other in a play-free manner, which results in disadvantages when closing the valve.

SUMMARY OF THE INVENTION

An object of the invention is therefore to provide a valve having a simple construction and which enables rapid and reliable closure.

This object is achieved in that the piston has an annular base member having a sealing edge, in that the annular base member has a base constructed as a membrane, in that the membrane has a bushing at the center thereof and in that the bushing is connected to the pin.

By the membrane being arranged, a relative movement, in particular a pivot movement, is enabled between the piston and the pin. At the same time, it is ensured that only a small pivoting of the piston with respect to the pin is possible. Depending on the application, the pivot angle can be produced from a few degrees to some tenths of a degree. This small pivoting is sufficient to compensate for the positional deviations between the piston and the valve seat. At the same time, a rapid closure of the valve is ensured since the pivot angle can be limited. As a result of the construction of the membrane, the maximum possible pivot angle can be selectively adjusted so that the valve can be adapted to different application fields. However, the main advantage is that in this manner a play-free connection between the pin and piston is achieved, which is a decisive factor in particular in the operating field of the valve. The bushing arranged centrally on the membrane further has the advantage that a reliable connection to the pin is achieved.

In advantageous embodiments, the membrane comprises metal or plastics material, wherein a membrane of metal can be constructed in a particularly thin manner.

In another embodiment, the membrane is arranged at right angles with respect to the axis of symmetry of the base member.

The membrane may have different forms. The membrane can be produced in a cost-effective manner when it is disk-like.

A reinforcement of the membrane with consistent thickness can be achieved in another embodiment when the membrane has concentric shoulders or beads.

A simple and reliable connection of the base member to the membrane is achieved when the base member comprises plastics material and the membrane is injection-molded as an insertion component in the base member. In this manner, reliable connections can be produced, in particular when the base member and membrane comprise different materials.

With a plastics material membrane, however, it is also possible to produce this together with the base member by injection-molding so that the membrane is integrally connected to the base member and both form a single component.

The simple connection of the bushing and membrane can be carried out by pressing. In particular with thin membranes, however, a reliable connection is achieved by the bushing being welded to the membrane.

When a plastics material membrane is used, the bushing may be an integral component of the membrane by injection-molding.

The membrane may comprise solid material. However, it has been found to be advantageous to construct the membrane with at least two, preferably four to six openings. The material separating the openings from each other acts in these instances as resilient regions so that, as a result of the shape of the openings, the resilience of the membrane can be adjusted in a selective manner. In particular, this shaping enables the use of a basic form of membrane, while the adaptation to the different fields of application is carried out by the type and number of openings. Another advantage is that the membrane may have a larger thickness, whereby it is on the whole more dimensionally stable since the resilience is adjusted by the regions remaining between the openings.

The connection of the pin to the bushing can be carried out by screwing or welding. A substantially more cost-effective connection can be achieved by pressing. In this instance, the pin can be pressed into the bushing or the bushing can be pressed into the pin.

The component intended to be pressed in can be assembled in a particularly easy manner when a collar for limiting the movement of the component intended to be pressed in is provided on the pin or the bushing.

In order to reduce the pressure loading of the valve, in particular the housing, the pin has a longitudinal hole that extends through the pin and via which a pressure compensation can be carried out.

For an even more rapid pressure compensation and in order, where applicable, to minimize noises as a result of the pressure compensation, the pin additionally has a transverse hole that extends at right angles relative to the longitudinal axis and also extends through the pin and which is connected to the longitudinal hole.

BRIEF DESCRIPTION OF THE DRAWINGS

The invention is described in greater detail with reference to the drawings, in which.

DETAILED DESCRIPTION OF THE PRESENTLY PREFERRED EMBODIMENTS

Figure 1:
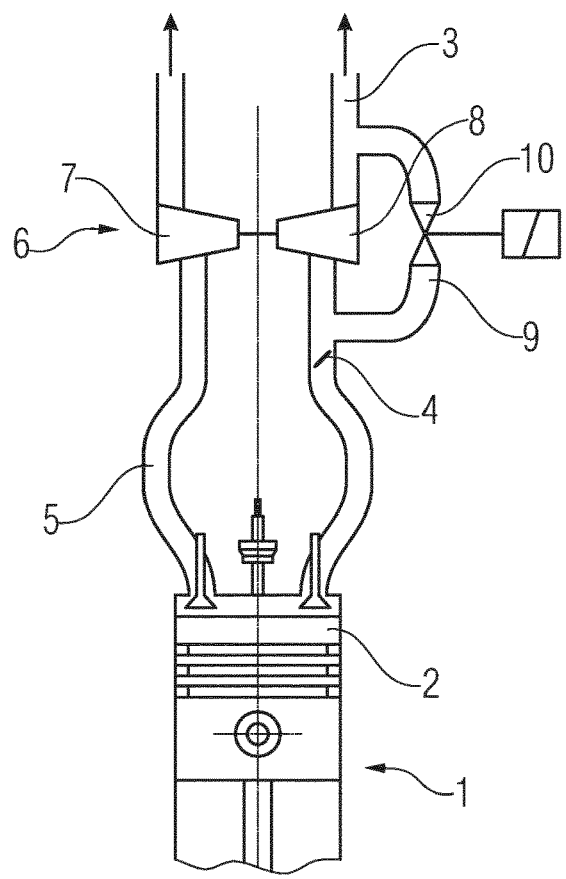
FIG. 1 is a schematic illustration of the arrangement of the valve.

FIG. 1 shows a portion of the drive train of a motor vehicle with a cylinder 1, a cylinder piston 2 that can be moved therein and a fresh air line 3 that opens in the cylinder 1 and that has a throttle valve 4 arranged therein and an exhaust gas line 5 extending out of the cylinder 1. There is further arranged a turbocharger 6 connected to both lines 3, 5. The turbocharger 6 comprises a turbine 7 connected to the exhaust gas line 5 and a compressor 8 connected to the fresh air line 3. By a bypass line 9, the pressure built up by the compressor 8 when the throttle valve 4 closes can be returned by discharging the compressed air. The bypass line 9 is opened or closed by a recirculation air valve 10.

Figure 2:
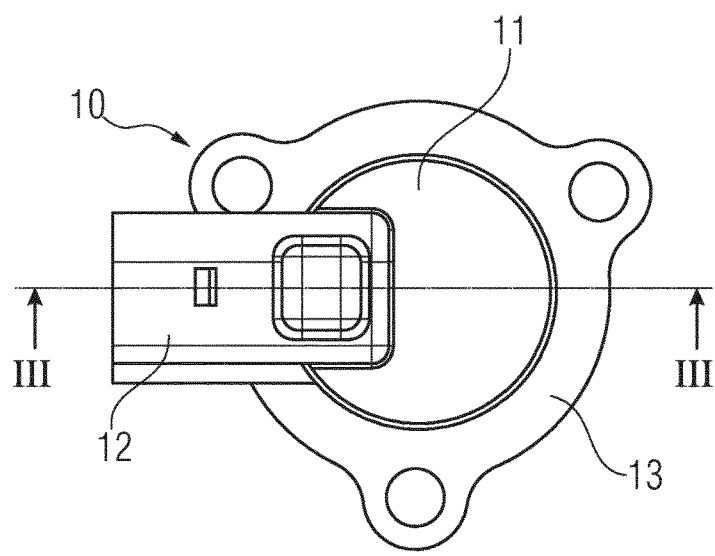
FIG. 2 is a plan view of the valve.

The valve 10 in FIG. 2 comprises a housing 11 having a bushing 12 formed in one piece for electrically connecting the valve 10. The housing 11 further has a formed-on flange 13 and three holes via which the housing 11 is flanged to the turbocharger 6 in the region of the bypass line 9.

Figure 3:
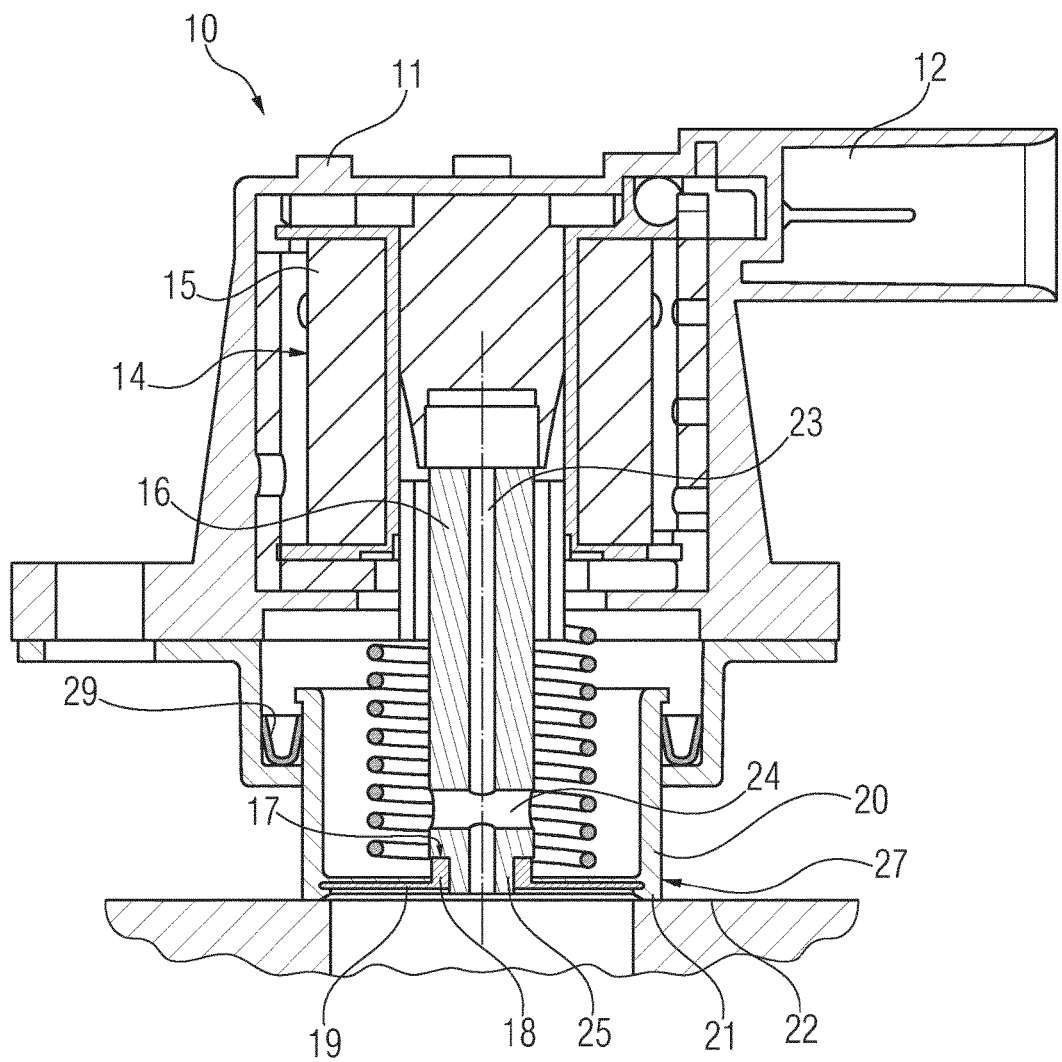
FIG. 3 is a section through the valve according to FIG. 2.

In the housing 11, according to FIG. 3, a solenoid 14 is arranged with a coil 15 and a metal pin 16. The metal pin 16 has at its end 25 facing away from the solenoid 14 a radially peripheral collar 17. The end 25 is pressed into a bushing 18 of a membrane 19, wherein the collar 17 and bushing 18 are in abutment with each other. The membrane 19 is connected to an annular base member 20 of plastics material. The annular base member 20 has at its side facing away from the solenoid 14 a peripheral sealing edge 21. In the closure position shown, the sealing edge 21 is in abutment with the valve seat 22 to close the bypass line. The further construction of the piston 27 is described in the following FIGS. 4, 5. The metal pin 16 further has a longitudinal hole 23 and a transverse hole 24 arranged at right angles relative thereto. Both holes 23, 24 extend through the pin 16 and are used for pressure compensation in the housing 11, the transverse hole 24 being provided for rapid pressure compensation.

Figure 4:
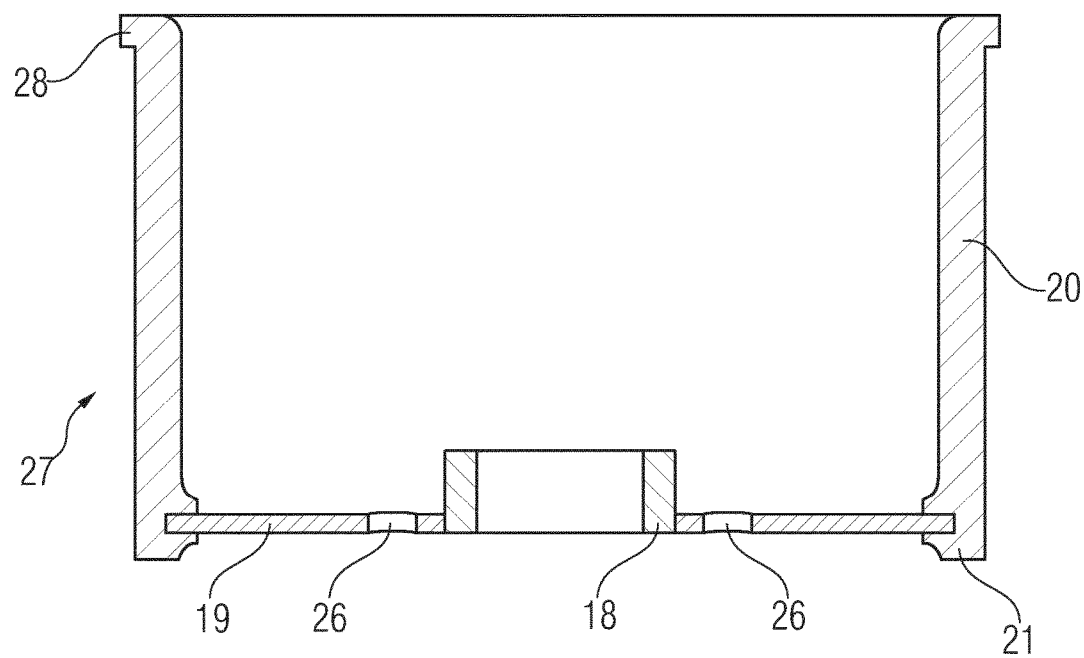
FIG. 4 is a section through the piston.
Figure 5:
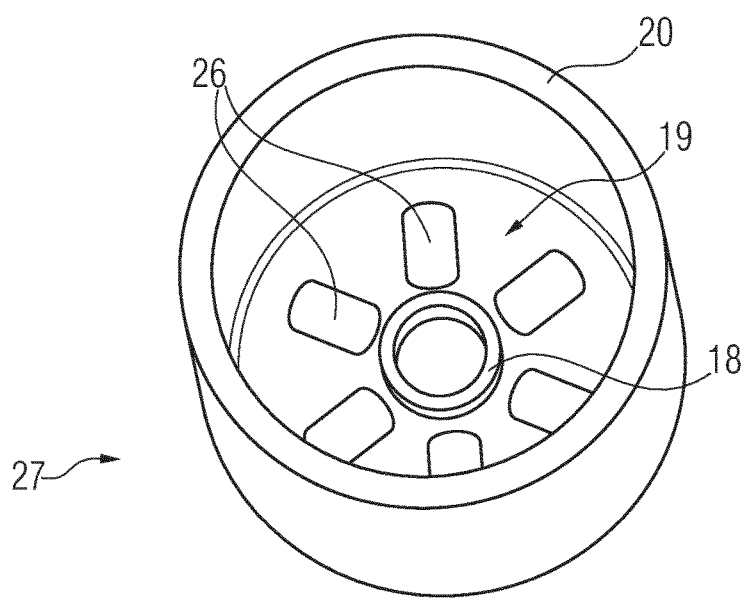
FIG. 5 is a perspective illustration of the piston.

The piston 27 in FIGS. 4, 5 has a disk-like membrane 19 of metal having a thickness of 0.5 mm. The bushing 18 is welded at the center of the membrane 19. The membrane 19 has openings 26, via which a pressure compensation takes place. The membrane 19 is securely connected at its periphery to the base member 20 by being introduced as an insertion component in an injection mold and being injected with plastics material. The membrane 19 forms with the cylindrical base member 20 a pot-like piston 27. At the open end thereof, there is formed on the base member 20 a bead 28 which forms a limitation of the piston movement by abutment of the seal 29 in FIG. 3.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
a housing (11);
a solenoid (14) arranged in the housing (11);
a pin (16) configured so as to be movable by the solenoid, the pin (16) having a portion having a first diameter, and an end (25), the end (25) comprising the bottommost portion of the pin (16) most axially distal the solenoid (14), the pin having, at the end (25), a second diameter, less than the first diameter, so that the end (25) forms a radially inwardly extending peripheral collar (17);
a piston (27) connected to the pin (16);
a seal (29); and
a housing component having at least one L-shaped contour, arranged so as to house the seal (29),
wherein:
the piston (27) has an annular base member (20) comprising a cylindrical wall and having a sealing edge (21),
the piston (27) has a base constructed as a disk-shaped metal membrane (19), the disk-shaped metal membrane (19) being connected to the annular base member (20) along the periphery of the disk-shaped metal membrane (19) at a side of the cylindrical wall distal the solenoid (14),
the disk-shaped metal membrane (19) having a bushing (18) welded to the disk-shaped metal membrane (19), the bushing (18) being arranged so as to surround the disk-shaped metal membrane's center, an outer diameter of the bushing (18) being smaller than the diameter of the disk-shaped metal membrane (19) so as to define an outer annular floor portion of the disk-shaped metal membrane (19) extending radially from the outer diameter of the bushing (18) to the periphery of the disk-shaped metal membrane (19), the outer annular floor portion having plural openings formed therein,
the radially inwardly extending peripheral collar (17) is arranged so as to be radially surrounded by the bushing (18) so as to form a press-fit connection of the end (25) of the pin (16) to the bushing (18) of the disk-shaped metal membrane (19) such that the collar (17) and the bushing (18) are in abutment with one another, and
the housing component having the at least one L-shaped contour is arranged so as to sleeve the cylindrical wall of the piston.

2. The valve as claimed in claim 1, wherein the disk-shaped metal membrane (19) is arranged at right angles with respect to an axis of symmetry of the annular base member (20).

3. The valve as claimed in claim 1, wherein the collar (17) is configured to limit movement of the pin (16).

4. The valve as claimed in claim 1, wherein the pin (16) has a longitudinal hole (23) extending through the pin (16).

5. The valve as claimed in claim 4, wherein the pin (16) has a transverse hole (24) extending at right angles relative to a longitudinal axis of the pin (16), the transverse hole (24) extending through the pin (16) and being connected to the longitudinal hole (23).

6. The valve as claimed in claim 1, wherein the outer annular floor portion of the disk-shaped metal membrane (19) has four to six openings (26).

7. The valve as claimed in claim 1, wherein the collar (17) is configured to limit movement of the bushing (18).

* * * * *